INVENTOR
DEREK GEORGE WOODWARD INGRAM

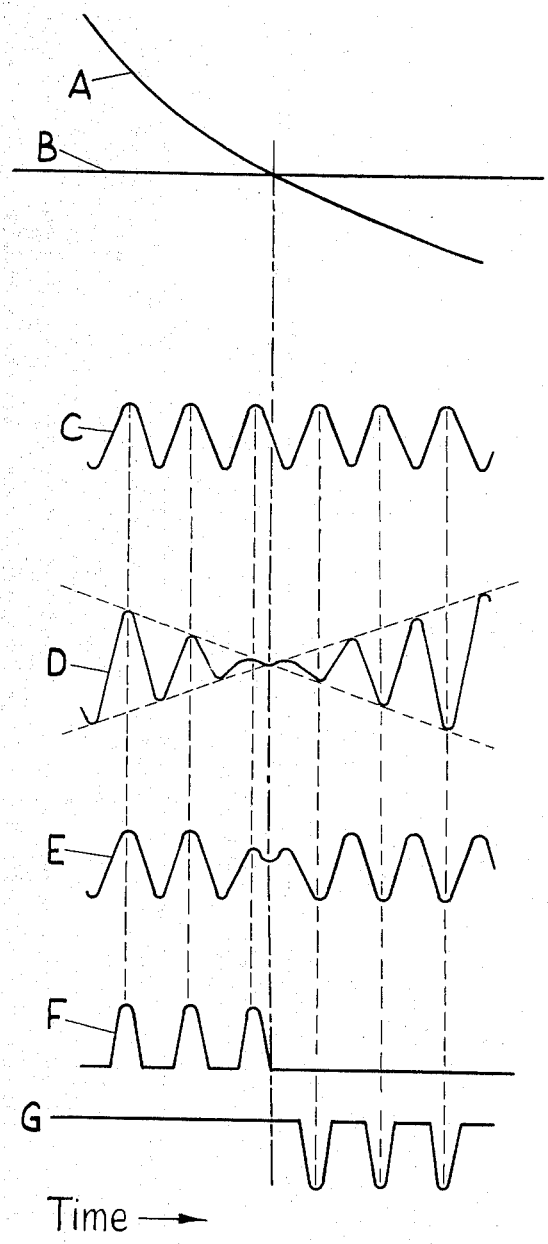

United States Patent Office 3,231,821
Patented Jan. 25, 1966

3,231,821
ELECTRIC COMPARATOR CIRCUITS
Derek George Woodward Ingram, Harrow, Middlesex,
England, assignor to The General Electric Company
Limited, London, England
Filed Nov. 5, 1962, Ser. No. 235,374
Claims priority, application Great Britain Nov. 8, 1961
6 Claims. (Cl. 325—141)

This invention relates to electric comparator circuits. More particularly, but not exclusively, the invention relates to electric comparator circuits which may be used in pulse communication systems.

In known pulse communication systems, the voltages of a plurality of audio frequency signals which are to be transmitted over the system are sampled in rotation at frequent, regularly recurrent instants. Each sample voltage so obtained is then supplied to a comparator circuit where it is compared with a reference voltage. Whilst being supplied to the comparator circuit the value of the sample voltage or of the reference voltage is varied in some predetermined manner. For example, the value of the reference voltage may be varied linearly with respect to time. The comparator circuit is then arranged to give an indication when the values of the two voltages supplied thereto are equal, and the time interval between when this indication is given and some predetermined time is a measure of the voltage of the sample. The signal transmitted is then a pulse signal which defines the duration of these time intervals.

In the past, a two-condition bistable circuit making use of transistors has been used as a comparator circuit in such a system, the bistable circuit being arranged to change from one of its stable conditions to the other when the two voltages supplied thereto are equal in value. Difficulties may, however, arise with such an arrangement, because the point at which the bistable circuit changes its condition is not stable if there are variations in temperature. Also the characteristics of the transistors used, in particular their cut-off frequencies, limit the speed of operation.

It is therefore an object of the present invention to provide an electric comparator circuit in which these difficulties are, at least in part, overcome.

According to the present invention, an electric circuit comprises a network which includes a capacitative impedance, the capacitance of which varies with the voltage applied across the impedance, and means to supply a variable voltage across the impedance, the arrangement being such that for a certain value of the variable voltage the network is balanced and supplies no output signal, and for other values of the variable voltage the network is unbalanced and supplies an output signal which is characteristic of the side of the balance condition on which the network is operating.

According to a feature of the present invention, an electric comparator circuit comprises a bridge network having four impedance arms, the impedances in two arms being capacitative and the capacitance of at least one of these capacitative impedances varying with the voltage applied across the impedance, means to supply a variable voltage across the capacitative impedance, the capacitance of which varies with applied voltage, and means to apply a fixed voltage across the other capacitative impedance, the arrangement being such that for a certain value of the variable voltage the bridge network is balanced and supplies no output signal, and for other values of the variable voltage the bridge network is unbalanced and supplies an output signal which is characteristic of the side of the balance condition on which the network is operating.

Preferably the capacitative impedance, the capacitance of which varies with applied voltage, is the capacitative part of the junction impedance of a semiconductor junction diode which is biased in its reverse direction. The other capacitative impedance may be a capacitor of fixed value, or may comprise the capacitative part of the junction impedance of a diode which is similar to the first-mentioned diode and which is also biased in its reverse direction.

The comparator circuit may form part of the transmitter of a pulse communication system, in which case, either the variable voltage or the fixed voltage may represent a sample voltage of an audio frequency signal which is to be transmitted over the system.

An electric comparator circuit in accordance with the present invention will now be described by way of example with reference to the accompanying drawings, in which:

FIGURE 2 shows the waveform of signals which appear at various points in the circuit of FIGURE 1 during operation.

Figure 1:
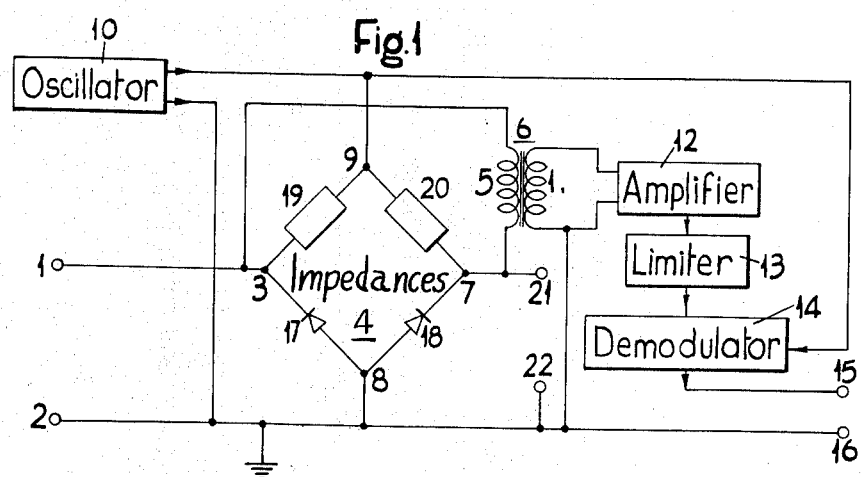
FIGURE 1 shows the circuit in simplified form.

The comparator circuit to be described forms part of the transmitter of a pulse code modulation communication system. Before referring to the drawings, the system and, in particular, the transmitter will be briefly described in order to provide a background against which the operation of the comparator circuit may be more readily understood.

The system is a twenty-five channel time division multiplex telephone system, over which up to twenty-five audio frequency signals may be passed simultaneously. The signal passed from the transmitter to the receiver comprises a pulse signal, having a pulse repetition frequency of 2 megacycles per second. This signal is made up of successive groups of two hundred pulse positions, each position of which may or may not be occupied by a pulse for the purpose of indicating the presence or absence of a digit respectively. Each group of two hundred pulse positions falls into twenty-five channel groups corresponding to the twenty-five channels, respectively, each channel group comprising eight pulse positions. In each channel group, the first (or the last) seven pulse positions give the required information concerning the audio frequency signal to be transmitted over that channel, and the eighth pulse position may be used for the purpose of signalling and synchronising.

Considering now the equipment at the transmitter, the voltages of the incoming audio frequency signals which are to be transmitted are sampled in rotation, 10,000 time per second. The sample voltages so obtained, may, of course, be of either polarity, but for the purpose of the present description it is sufficient to assume that they are all of the same polarity and that the question of polarity is dealt with separately, for example, as described in the specification to my United States copending patent application No. 235,375 filed November 5, 1952, and assigned to the assignee of the present application. In fact, all the sample voltages will be assumed to be negative.

To each sample voltage there is then added a direct current component of the same polarity (negative), this component being hereinafter referred to as an added voltage $x$.

As there are twenty-five channels and the incoming audio frequency signal on each of these channels is sampled 10,000 times per second, the sampling period available for obtaining a sample on a channel and performing the required operations subsequent to sampling is 4 microseconds.

The equipment at the transmitter which is common to all the channels includes a capacitor which has associated with it an arrangement of gates whereby, during each sampling period of 4 microseconds, the capacitor goes through the following sequence of operations. Initially the capacitor is charged to a level $s+x$, $s$ corresponding to the level of the relevant sample voltage. Next, the charge on the capacitor is permitted to decay exponentially by way of a resistor through which the capacitor is able to discharge to earth. The time constant of the decay is dependent on the values of the capacitor and the resistor. These are chosen such that in the case where the charge initially stored on the capacitor has the maximum possible value, the charge on the capacitor will have decayed to the level corresponding to the added voltage $x$ just prior to the end of that part of the sampling period allotted to the decay of the charge on the capacitor. Subsequent to this, during the last part of the sampling period, the capacitor is discharged in preparation for having stored upon it a charge corresponding to the sample voltage in respect of the incoming audio frequency signal on the next channel.

During the period when the charge on the capacitor is decaying, a signal, the level of which corresponds to the charge remaining on the capacitor, is supplied to a comparator circuit to which is also supplied a signal having a constant level corresponding to the added voltage $x$. (In fact the level of this other signal may not correspond exactly to the added voltage $x$, for a reason to be mentioned later.)

The comparator circuit is arranged to produce a pulse signal comprising pulses having a repetition frequency of 16 megacycles per second. The beginning of this pulse signal coincides in time with the instant when the charge on the capacitor starts to decay, and the end of this pulse signal coincides in time with the instant when the charge on the capacitor has decayed to the level corresponding to the added voltage $x$, that is to say, the instant the voltages of the two signals supplied to the comparator circuit are of equal value. The number of pulses in the pulse signal therefore defines the magnitude of the corresponding sample voltage.

It should be appreciated that although the number of pulses in the pulse signal unambiguously defines the magnitude of the corresponding sample voltage, the number of pulses is not linearly proportional to the magnitude of the corresponding sample voltage. The result of this want of linear proportionality between the number of pulses in the pulse signal, and the magnitude of the corresponding sample voltage, is that a change in the voltage of an incoming audio frequency signal, which change brings about a change of one in the number of pulses in the pulse signal, represents a smaller change in the voltage of an audio frequency signal of comparatively small amplitude than it does in the case of an audio frequency signal of comparatively large amplitude. This has the effect of improving the signal to noise ratio of an audio frequency signal of comparatively small amplitude.

Each pulse signal is then supplied to a counter which counts the number of pulses and codes the resulting count to provide a pulse output which occupies six pulse positions in a channel group. The arrangement for dealing with the polarity of each sample voltage is used to provide a pulse, or not, as the case may be, for the seventh pulse position in the channel group, the eighth pulse position remaining for the purpose of signalling and synchronising.

Referring now to FIGURE 1 of the drawings, the part of the transmitter shown comprises the comparator circuit which, as shown in simplified form in FIGURE 1 includes input terminals 1 and 2, the terminal 2 being connected to earth. The terminal 1 is connected to a point 3 which is at one end of a diagonal of a bridge network 4, and also by way of the primary winding 5 of a transformer 6 to a point 7 which is at the other end of that diagonal. (Some arrangement, for example a capacitor, is provided to give direct current blocking between the points 3 and 6. This arrangement is not shown in FIGURE 1.)

Points 8 and 9 are situated at the ends of the other diagonal of the bridge network 4, the point 8 being connected to earth, and an oscillator 10 which supplies a signal having a frequency of 16 megacycles per second, is connected between the points 8 and 9. The secondary winding 11 of the transformer 6 is connected to the input of an amplifier 12, one terminal of the secondary winding 11 also being connected to earth. The output of the amplifier 12 is connected by way of a limiter 13 to a phase sensitive demodulator 14, to which the output of the oscillator 10 is also connected. Output terminals 15 and 16 are connected to the output of the demodulator 14 and to earth, respectively.

Similar semiconductor junction diodes 17 and 18 are connected between the points 3 and 8, and 7 and 8, respectively, each of the diodes 17 and 18 having its anode terminal nearer the point 8. Impedances 19 and 20 are connected between points 3 and 9, and 7 and 9, respectively. Terminals 21 and 22 are connected to the points 7 and 8, respectively. Some arrangement (not shown) is also provided to reverse bias each of the diodes 17 and 18.

During operation, an input signal having a voltage $V_s$, which corresponds to the charge remaining on the capacitor which was initially charged to the voltage $s+x$, is applied between the terminals 1 and 2, that is across the diode 17. At the same time a reference signal having a voltage $V_r$, which corresponds to the voltage $x$ is applied between the terminals 21 and 22, that is across the diode 18. Under conditions of reverse bias the diodes 17 and 18 appear as capacitors shunted by resistors of very large value, due to the capacitance of the semiconductor junctions. At the high frequencies involved the resistors may be neglected and the value of the capacitors are dependent on the voltages applied across the diodes 17 and 18. If then the values of the impedances 19 and 20 are adjusted so that the bridge network 4 is balanced when:

$$V_s = V_r$$

then clearly any variation in $V_s$ will cause a change in the capacitance of the diode 17 which will cause the bridge network 4 to become unbalanced.

An increase in the magnitude of $V_s$ will reduce the capacitance of the diode 17 and a decrease in the magnitude of $V_s$ will increase the capacitance of the diode 17. If it is assumed that the impedances 19 and 20 are capacitors (although this is not essential), and that the input impedance of the amplifier 12 is high, then the voltages between the point 3 and earth, and between the point 7 and earth will be in phase with the output of the oscillator 10. This means that the input to the amplifier 12 will either be in phase or 180° out of phase with the output of the oscillator 10. Furthermore it is arranged that the gain of the amplifier 12 is sufficiently high for the limiter 13 to maintain an output of substantially constant amplitude except when the bridge network 4 is very close to being balanced.

The waveforms of signals appearing at various points in the arrangement of FIGURE 1 are then as shown in FIGURE 2 of the drawings to which reference is now also made. Waveform A represents the voltage $V_s$, the level of which falls exponentially as the capacitor from which the input signal is derived discharges. The waveform B represents the reference voltage $V_r$, whilst the waveform C represents the output of the oscillator 10.

The input to the amplifier 12 is then as represented by the waveform D, the amplitude of this input decreasing to pass through zero amplitude at the instant when the levels of the voltages $V_s$ and $V_r$ are equal, and then increasing again. In addition, the phase of the signal represented by the waveform D changes by 180° as the bridge network 4 passes through the balance condition. The waveform E represents the output supplied by the limiter 13 to the demodulator 14, this output being of constant amplitude except in the region where the bridge network 4 passes through the balance condition.

Waveforms F and G represent two alternative outputs which may be derived from the demodulator 14 between the terminals 15 and 16. In the present case the output represented by the waveform F is required, this output comprising a pulse signal including a train of pulses which is arranged to begin when the capacitor from which the input voltage $V_s$ is derived starts to discharge, and which ends, as shown, when the levels of the input voltages $V_s$ and $V_r$ are equal. The number of pulses in the pulse signal represented by the waveform F therefore defines the amplitude of the corresponding sample amplitude of an audio frequency signal, as required.

The demodulator 14 may, incidentally, be looked upon as an "AND" gate.

The variation in the capacitance of the diodes 17 and 18 with temperature is small, and no control of their temperature may therefore be necessary. If desired, however, the diodes 17 and 18 may both be mounted in the same copper block thus ensuring that the diodes 17 and 18 are both at the same temperature, or, for still greater accuracy, in a temperature controlled enclosure, which can be of conveniently small size due to the small size of the diodes 17 and 18. As a further alternative the impedances 19 and 20 may be arranged to be temperature sensitive and to vary with temperature in such a way as to compensate for changes in the capacitances of the diodes 17 and 18 with temperature. The capacitance of the diodes 17 and 18 does not vary appreciably with frequency, and hence there is no inherent limit on the frequency at which the arrangement can be operated.

Figure 3:
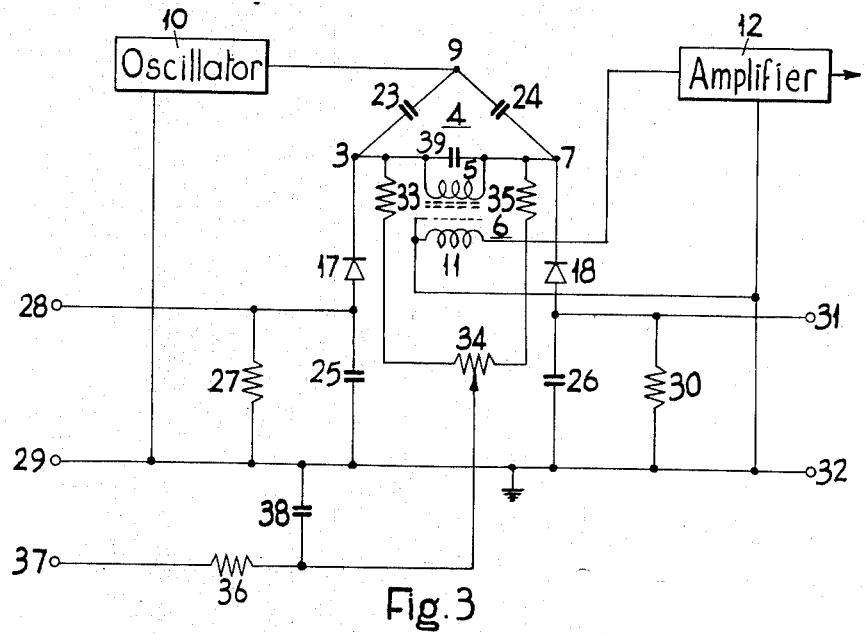
FIGURE 3 shows the circuit of FIGURE 1 in more detail.

The arrangement is shown in greater detail in FIGURE 3 of the drawings, to which reference is now made. Where possible similar reference numerals are used in FIGURES 1 and 3.

In this arrangement the impedances 19 and 20 of FIGURE 1 are capacitors 23 and 24 of equal value. The diodes 17 and 18, which are in fact Zener diodes, although this is not essential, are provided as before, the anode terminals of the diodes 17 and 18 being connected to earth by way of capacitors 25 and 26, respectively. The capacitor 25 is shunted by a resistor 27 the ends of which are connected to input terminals 28 and 29. The capacitor 26 is shunted by a resistor 30, the ends of which are connected to input terminals 31 and 32. The impedances measured between the diodes 17 and 18 and earth are very low at a frequency of 16 magacycles per second, and do not therefore materially effect the operation of the bridge network 4.

The capacitor 25 is the capacitor which, during operation, is charged to the voltage $s+x$ by means of a signal supplied between the terminals 28 and 29. The capacitor 25 then discharges to earth through resistor 27 with the required time constant. The reference voltage $V_r$ is applied continuously between the terminals 31 and 32, the capacitor 26 and the resistor 30 being included merely to make the initial balancing of the bridge network 4 easier.

The point 3 is connected to the point 7 by way of a resistor 33, a potentiometer 34, and a resistor 35 equal in value to the resistor 33, connected in series in that order. The potentiometer 34 has a variable tapping point which is connected by way of a resistor 36 to a terminal 37, the end of the resistor 36 nearer the potentiometer 34 being decoupled to earth by way of a capacitor 38. During operation, a potential is applied to the terminal 37 for the purpose of reverse biasing the diodes 17 and 18.

The transformer 6 with primary winding 5 and secondary winding 11 is provided as before, the primary winding 5 being tuned to a frequency of 16 megacycles per second by a capacitor 39. The secondary winding 11 is connected to the input of the amplifier 12.

In a typical embodiment of the comparator circuit of FIGURE 3 some of the components are as follows:

Capacitors 23 and 24—47 picofarads
Capacitors 25 and 26—1,000 picofarads
Resistors 27 and 30—1 kilohm The diodes 17 and 18 are Zener diodes, and have a capacitance of about 50 picofarads when a reverse bias of 2 volts is applied across them.

The operation of the comparator circuit is then similar to that described with reference to FIGURE 1. To balance the bridge network 4 initially, the position of the tapping point on the potentiometer 34 is varied, this having the effect of compensating for any want of equality in the resistive part of the junction impedance of the diodes 17 and 18 when reverse biased. This want of equality will arise where, as is likely, the diodes 17 and 18 are not exactly identical.

If this is so the capacitive part of the impedance of the diodes 17 and 18 may also be unequal, and this inequality cannot be corrected merely by varying the position of the tapping point on the potentiometer 34. As, however, the junction capacitance of the diodes 17 and 18 is dependent upon the applied voltage, the capacitance of the diode 18 can be made equal to that of the diode 17 by varying the value of the reference voltage $V_r$. This means that the reference voltage $V_r$ does not correspond exactly to the added voltage $x$ but this does not, in fact, affect the operation.

The value of the reverse bias applied to the diodes 17 and 18 will normally only be a few volts, and this means that it would not be impossible for the instantaneous sum of the input voltage $V_s$ and the oscillatory signal supplied by the oscillator 10 to be such as to cause the diodes 17 and 18 to conduct, either in their forward direction or by reverse breakdown. Such conduction, caused by a large value of input voltage $V_s$, will only occur when the bridge network 4 should, in any case, be unbalanced, and will not therefore affect the operation. The amplitude of the signal supplied by the oscillator 10 should, however, be sufficiently small to prevent either of the diodes 17 or 18 conducting at times when the bridge network 4 is close to balance.

The amplifier 12 has a broad bandpass, covering the frequency range 8 to 24 megacycles per second. The amplifier 12 should not respond to signals having low frequencies, as otherwise its output will include components of the input voltage $V_s$. It is also desirable that the amplifier 12 should reject second and higher harmonics of the signal supplied by the oscillator 10. On the other hand, the pass band of the amplifier 12 should be fairly wide, to give a good transient response.

As previously stated, the overall phase shift between the oscillator 10 and the demodulator 14 (FIGURE 1) must be zero or 180 degrees, so that if any phase shift (additional to the required phase reversal) occurs in the bridge network 4, an appropriate correction should be made by the amplifier 12.

Some modifications of the arrangement described are possible. For example, it is not essential for the level of the input voltage $V_s$ to decay towards the fixed level of the reference voltage $V_r$. It could be arranged that the input voltage $V_s$ has a fixed value corresponding to a sample voltage and that the value of the reference voltage $V_r$ is varied, for example, in the manner of a linear ramp.

In such a case it will be appreciated that the comparison between the values of the input voltage $V_s$ and the reference voltage $V_r$ take place at a variable value. This being so it is necessary that the non-conducting regions for the diodes 17 and 18 cover the whole range of values at which there may be equality between the input voltage $V_s$ and the reference voltage $V_r$. The diodes 17 and 18 must also be sufficiently closely matched to ensure that the bridge network 4 is balanced when:

$$V_s = V_r$$

for all possible values of the reference voltage $V_r$. Again, some modification of the initial balancing arrangements will be necessary as it is no longer possible to vary the reference voltage $V_r$ for this purpose.

One alternative would be to make the reference voltage $V_r$ of opposite polarity to the input voltage $V_s$ and to apply their difference to the diode 17. In this case the bridge network 4 would be arranged to balance when:

$$V_s - V_r = 0$$

so that the balance condition would always occur at the same value. This being so, the diode 18 could, in fact, be replaced by a capacitor of fixed value.

A further point about the arrangement of FIGURE 3 is that the capacitance of the diode 17, which is not constant, forms a part of the capacitance in the capacitance/resistance network which is giving rise to the decaying input voltage $V_s$. In the example given the capacitance of the diode 17 is small relative to that of the capacitor 25 and this effect will not be serious. If desired, however, it may be corrected by modification of the capacitance/resistance network, by imposing a small compensating signal on the reference voltage $V_r$, or by including a further diode the capacitance of which varies in the opposite sense to that of the diode 17 as the voltage across the diode 17 and the further diode changes.

A number of further modifications are possible, in particular it is not essential to use an ordinary four arm bridge network so long as the network used can be balanced and, when not balanced, supplies an output signal which is characteristic of the side of the balance condition on which the network is operating. Furthermore, it is not essential that the input signal be oscillatory. It could, for example, be a pulse signal.

The utility of the invention is not limited to pulse code modulation systems using the particular method of coding described.

For example, the invention could be used in a sequential type of coder. In such a coder a sample voltage is obtained, and its amplitude is compared with a first comparison voltage which has half the maximum possible amplitude of the sample voltage. If the sample voltage is greater than the first comparison voltage, the first comparison voltage is subtracted from the sample voltage to form a derived sample voltage, which is then compared with a second comparison voltage which has a quarter of the maximum possible amplitude of the sample voltage. If the sample voltage is less than the first comparison voltage, the sample voltage is compared with the second comparison voltage without first subtracting the first comparison voltage. This process is repeated several times to obtain successively nearer approximations to the sample voltage. The code group produced then indicates the amplitude of the sample voltage by indicating the result of these successive comparisons.

Considering the bridge network 4 of FIGURE 1, this could be used in such a coder by supplying the sample voltage across the diode 17 and the first comparison voltage across the diode 18. A single pulse is then supplied between the points 8 and 9 in place of the oscillatory signal. This will result in an output pulse appearing between the points 3 and 7, the polarity of this pulse being dependent upon the side of the balance condition on which the bridge network 4 is then operating. Depending upon the polarity of this pulse, therefore, the coder operates to subtract the first comparison voltage from the sample voltage, or not, prior to making the next comparison. This process is repeated as many times as required.

Furthermore, the utility of the invention is not limited to pulse code modulation systems.

I claim:

1. An electric comparator circuit comprising a bridge network having four impedance arms, a voltage-controlled capacitative impedance connected in one of said arms, the capacitance of this impedance depending upon the D.C. voltage applied thereto, means to apply a variable D.C. voltage to said impedance, impedances in the other three arms such that the bridge network is balanced for a predetermined value of the variable voltage, supply means arranged to supply an A.C. energizing signal to said network, a pair of output conductors for said network at which said A.C. signal appears as an output signal when that network is unbalanced, the phase of this output signal relative to that of the corresponding energizing signal depending upon which side of the balance condition the bridge network is operating, and a phase sensitive demodulator to which are supplied said output signal and a portion of said energizing signal and which derives a pulse signal from these two signals when their relative phase corresponds to the operation of said bridge network on one particular side of said balance condition.

2. An electric comparator circuit comprising a bridge network having four impedance arms, two voltage-controlled capacitative impedances connected in two of said arms respectively, the capacitance of each impedance depending upon the D.C. voltage applied to that impedance, means to apply a variable D.C. voltage to one said impedance, means to apply a D.C. reference voltage to the other said impedance such that the bridge network is balanced for a predetermined value of the variable voltage, supply means arranged to supply an A.C. energizing signal to said network, a pair of output conductors for said network at which said A.C. signal appears as an output signal when that network is unbalanced, the phase of this output signal relative to that of the corresponding energizing signal depending upon which side of the balance condition the bridge network is operating, and a phase sensitive demodulator to which are supplied said output signal and a portion of said energizing signal and which is arranged to derive a pulse signal from these two signals when their relative phase corresponds to the operation of said bridge network on one particular side of said balance condition.

3. A circuit according to claim 2 wherein each capacitative impedance comprises the capacitative part of the junction impedance of a different one of two semiconductor junction diodes and wherein biasing means is connected to each said diode to bias that diode in its reverse direction.

4. A circuit according to claim 2 wherein an amplifier and limiter are connected in cascade between said output conductors and said phase sensitive demodulator whereby said output signal is amplified and said phase sensitive demodulator is supplied with a corresponding A.C. signal having an amplitude which is substantially independent of the degree of unbalance of said bridge network.

5. A circuit according to claim 2 wherein said means to apply a variable D.C. voltage to one said impedance means comprises capacitor means connected to this impedance means, means to change said capacitor means to a voltage level at which said bridge network operates on said one particular side of said balance condition and resistance means to permit the charge on said capacitor means to decay to a predetermined level at which said bridge network operates on the other side of said balance condition, a number of pulses thus being obtained from said phase sensitive demodulator during the decay of the charge on said capacitor means that characterizes the voltage level to which that capacitor means was initially charged.

6. A transmitter of a pulse communication system including a circuit according to claim 5 and in which the initial value of said variable voltage is determined by each sample amplitude of an audio frequency input signal which is supplied to the transmitter and sampled at regularly recurrent instants.

References Cited by the Examiner
UNITED STATES PATENTS
2,956,234  10/1960  Olsen _____ 331—138

DAVID G. REDINBAUGH, *Primary Examiner.*